(12) United States Patent
Chun et al.

(10) Patent No.: US 12,363,210 B2
(45) Date of Patent: Jul. 15, 2025

(54) FOLDABLE ELECTRONIC DEVICE

(71) Applicant: Samsung Electronics Co., Ltd., Gyeonggi-do (KR)

(72) Inventors: Woosung Chun, Gyeonggi-do (KR); Seungki Choi, Gyeonggi-do (KR); Seunghui Sunwoo, Gyeonggi-do (KR); Soyoung Lee, Gyeonggi-do (KR); Hyunju Hong, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 350 days.

(21) Appl. No.: 17/884,766

(22) Filed: Aug. 10, 2022

(65) Prior Publication Data

US 2023/0050984 A1 Feb. 16, 2023

Related U.S. Application Data

(63) Continuation of application No. PCT/KR2022/011950, filed on Aug. 10, 2022.

(30) Foreign Application Priority Data

Aug. 10, 2021 (KR) .................. 10-2021-0105545

(51) Int. Cl.
*H04M 1/02* (2006.01)
*G06F 1/16* (2006.01)

(52) U.S. Cl.
CPC ........ *H04M 1/0216* (2013.01); *G06F 1/1616* (2013.01); *G06F 1/1652* (2013.01);
(Continued)

(58) Field of Classification Search
CPC . H04L 41/0894; H04L 41/0895; H04L 41/40; H04W 4/50; H04W 48/08;
(Continued)

(56) References Cited

U.S. PATENT DOCUMENTS

2008/0073344 A1 3/2008 Kung et al.
2013/0286551 A1 10/2013 Ashcraft et al.
(Continued)

FOREIGN PATENT DOCUMENTS

JP 2004-177327 A 6/2004
JP 2005-303688 A 10/2005
(Continued)

OTHER PUBLICATIONS

Extended European Search Report dated Jul. 23, 2024.
International Search Report dated Nov. 18, 2022.

*Primary Examiner* — Nathan S Taylor
(74) *Attorney, Agent, or Firm* — Cha & Reiter, LLC.

(57) ABSTRACT

An embodiment disclosed herein relate to a foldable electronic device for improving open convenience and a control method thereof. According to an embodiment, the disclosure may provide a foldable electronic device including: a hinge structure; a first housing connected to the hinge structure; a second housing connected to the hinge structure and foldable with respect to the first housing around the hinge structure; a flexible display; a first magnet disposed in a position adjacent to an edge of the first housing and including a magnetic substance arranged along the longitudinal direction of the first housing; and a second magnet disposed in a position adjacent to an edge of the second housing and corresponding to the first magnet, and including a magnetic substance arranged along the longitudinal direction of the second housing. Various other embodiments are also disclosed.

13 Claims, 12 Drawing Sheets

(52) U.S. Cl.
CPC ........ *G06F 1/1681* (2013.01); *H04M 1/0268* (2013.01); *H04M 2201/08* (2013.01)

(58) Field of Classification Search
CPC ..... H04W 48/12; H04W 48/18; H04W 72/23; H04M 1/0216; H04M 1/0245; H04M 1/026; H04M 1/0268; H04M 1/02; H04M 2201/08; H01Q 1/243; H01Q 1/245; H01Q 21/28; H01Q 5/307; H01Q 9/42; G09F 9/30; G06F 1/16; G06F 1/1616; G06F 1/1652; G06F 1/1679; G06F 1/1681; G06F 1/1628; G06F 1/1635; G06F 1/1656; H01F 7/02
See application file for complete search history.

(56) References Cited

U.S. PATENT DOCUMENTS

| | | | |
|---|---|---|---|
| 2014/0347806 A1 | 11/2014 | Totani | |
| 2017/0047637 A1* | 2/2017 | Kim | H04W 4/70 |
| 2017/0145725 A1 | 5/2017 | Siddiqui | |
| 2017/0208157 A1 | 7/2017 | Kim et al. | |
| 2017/0308124 A1* | 10/2017 | Mathew | G06F 1/16 |
| 2018/0006798 A1 | 1/2018 | Bilstad et al. | |
| 2018/0067598 A1* | 3/2018 | Kauhaniemi | G06F 3/0412 |
| 2019/0258295 A1* | 8/2019 | Fujimoto | G09F 9/00 |
| 2019/0306290 A1 | 10/2019 | Lee et al. | |
| 2020/0019215 A1* | 1/2020 | Wang | G06F 1/1656 |
| 2020/0136668 A1* | 4/2020 | Chu | G06F 1/1616 |
| 2020/0266524 A1* | 8/2020 | Yoon | H01Q 13/16 |
| 2020/0267861 A1* | 8/2020 | Kim | H05K 1/147 |
| 2021/0034102 A1* | 2/2021 | Cho | H01F 7/0226 |
| 2021/0034106 A1 | 2/2021 | Jung | |
| 2021/0116959 A1 | 4/2021 | Heo et al. | |
| 2021/0167487 A1* | 6/2021 | Varma | H01Q 1/243 |
| 2021/0185164 A1* | 6/2021 | Jung | H01Q 1/42 |
| 2022/0083102 A1* | 3/2022 | Nishioka | G06F 1/1624 |
| 2022/0115768 A1* | 4/2022 | Oh | H01Q 5/385 |
| 2023/0028906 A1* | 1/2023 | Yoder | G06F 3/0416 |
| 2023/0097889 A1* | 3/2023 | Cao | G06F 1/1652 |
| | | | 361/679.01 |
| 2024/0324127 A1* | 9/2024 | Cho | H01F 7/02 |

FOREIGN PATENT DOCUMENTS

| | | |
|---|---|---|
| JP | 2008-84313 A | 4/2008 |
| JP | 2009-21749 A | 1/2009 |
| JP | 2015-5786 A | 1/2015 |
| KR | 1985-0000076 B1 | 10/1985 |
| KR | 10-2014-0136880 A | 12/2014 |
| KR | 10-2015-0110244 A | 10/2015 |
| KR | 10-2017-0069115 A | 6/2017 |
| KR | 10-2017-0086369 A | 7/2017 |
| KR | 10-2019-0043826 A | 4/2019 |
| KR | 10-2020-0007510 A | 1/2020 |
| KR | 10-2020-0067799 A | 6/2020 |
| KR | 10-2021-0015468 A | 2/2021 |
| KR | 10-2021-0027008 A | 3/2021 |
| KR | 10-2021-0069596 A | 6/2021 |
| WO | 03/054672 A1 | 7/2003 |
| WO | 2018/103497 A1 | 6/2018 |

\* cited by examiner

FOLDABLE ELECTRONIC DEVICE

CROSS-REFERENCE TO RELATED APPLICATION(S)

This application is a continuation of International Application No. PCT/KR2022/011950, which was filed on Aug. 10, 2022, and claims priority to Korean Patent Application No. 10-2021-0105545, filed on Aug. 10, 2021, in the Korean Intellectual Property Office, the disclosure of which are incorporated by reference herein their entirety.

BACKGROUND

Technical Field

One or more embodiments of the disclosure generally relate to a foldable electronic device.

Description of Related Art

As demand for mobile communication and the high level of integration of electronic devices have increased, various technologies have been developed to improve the portability of electronic device such as mobile communication terminals and to improve user convenience in connection with using multimedia functions and the like.

Mobile communication services have been extended to multimedia services such that users can use the mobile communication terminals to not only for voice calls or short message services, but also multimedia services such as video playback and gaming. Due to this, there has been increasing market pressure to implement larger displayed in electronic devices, for better user experience when using multimedia services. Moreover, foldable electronic devices equipped with flexible display panels have recently become available.

SUMMARY

A foldable electronic device may include a first housing, a second housing that is foldable in relation to the first housing, a hinge structure connecting between the first and second housings, and a flexible display disposed across the first and second housings.

In the folded state of the foldable electronic device, a part of the flexible display disposed above the first housing and another part of the flexible display disposed above the second housing may abut each other. The corresponding portions of the first and second housings may also abut each other. Such abutting parts of the first and second housings of the foldable electronic device may further include magnetic bodies, respectively, so as to fix the folded state of the foldable electronic device.

However, the magnetic bodies, if included, may partially protrude due to the action of pulling on each other when the first and second housings abut each other, which in turn may impart a force on the flexible display disposed between the magnetic bodies, and this may damage the electronic device or the flexible display.

In order to prevent the magnetic bodies from imparting a force on the display, the conventional arts may adopt such a structure so that the magnetic bodies may be seated and bonded onto the rear surface of the electronic device, and may then be fixed by a separate cap made of injection-molded material. However, such a structure in which magnetic bodies are seated, bonded, and installed onto the rear surface of the electronic device may increase the distance between the magnetic bodies, thereby making it difficult to provide sufficient magnetic force for fixing the folded state of the electronic device. If larger-sized magnetic bodies are disposed to obtain stronger magnetic force, the space for mounting other electronic components included in the electronic device may become insufficient.

According to an embodiment of the disclosure, a foldable electronic device may include a hinge structure, a first housing connected to the hinge structure, a second housing connected to the hinge structure and configured to be foldable with respect to the first housing around the hinge structure, a flexible display disposed on one surface of the first housing and one surface of the second housing, a first plate disposed inside the first housing and including a first surface facing a first direction, a second plate disposed inside the second housing and including a second surface facing a second direction parallel with the first direction in an unfolded state of the foldable electronic device, a first magnet disposed in a position adjacent to an edge of the first housing on the first surface of the first plate and including a magnetic substance arranged along the longitudinal direction of the first housing, and a second magnet disposed in a position adjacent to an edge of the second housing and corresponding to the first magnet on the second surface of the second plate, and including a magnetic substance arranged along the longitudinal direction of the second housing.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

According to the disclosure may provide a magnetic substance adopting such a structure that the magnetic substance is seated and bonded onto the front surface of an electronic device without imparting a force to a flexible display, and a structure for fixing the magnetic substance.

According to the disclosure, a magnetic substance fixation structure capable of stably maintaining the folded state of the foldable electronic device may be provided.

According to the disclosure, certain embodiments for preventing application of forces to the flexible display, in connection with disposing a magnetic substance fixation structure on a foldable electronic device, may be provided.

Hereinafter, various embodiments of the disclosure may be described with reference to the accompanying drawings.

Figure 1:
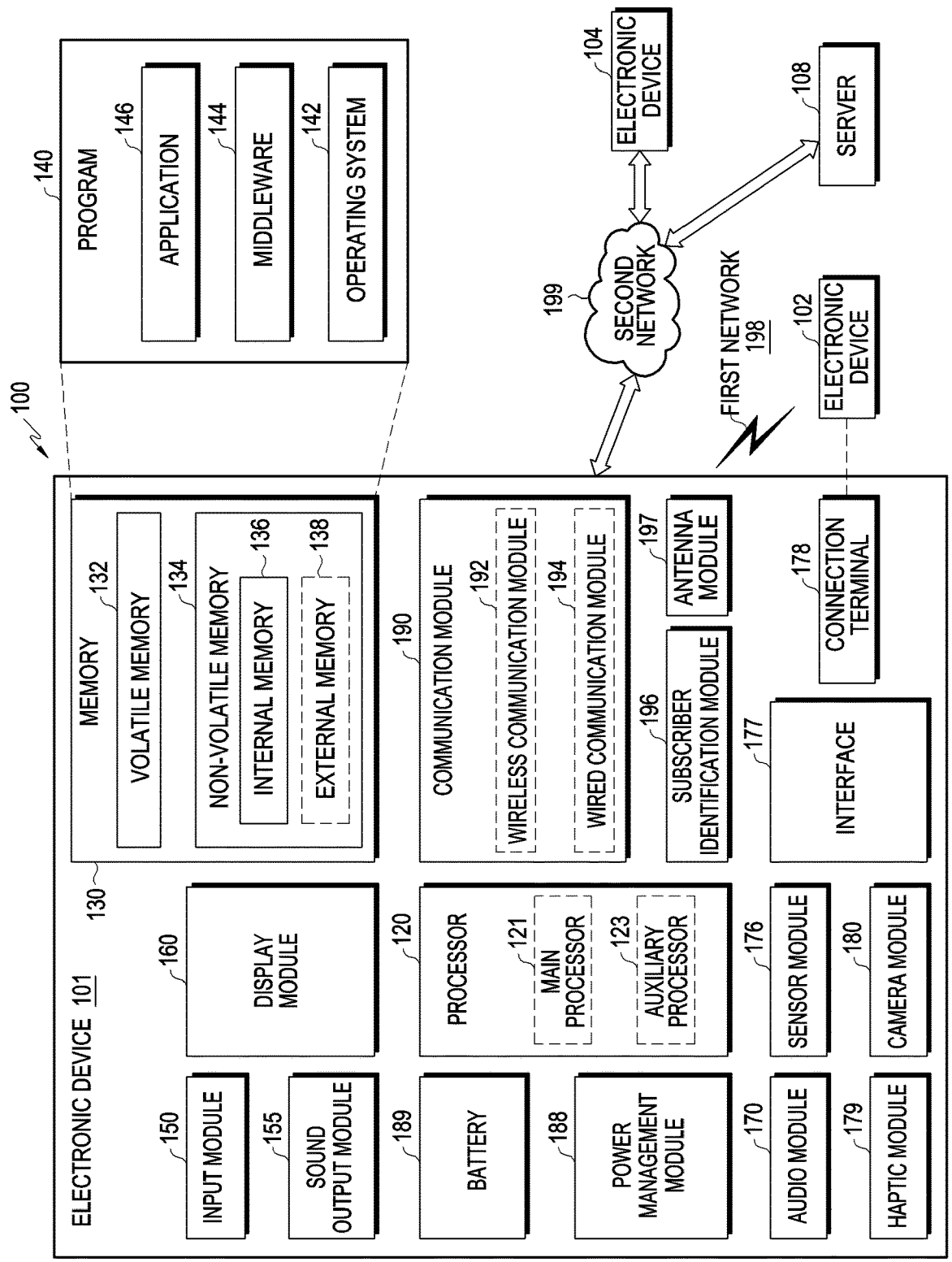
FIG. 1 is a block diagram illustrating an electronic device in a network environment according to an embodiment disclosed herein.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
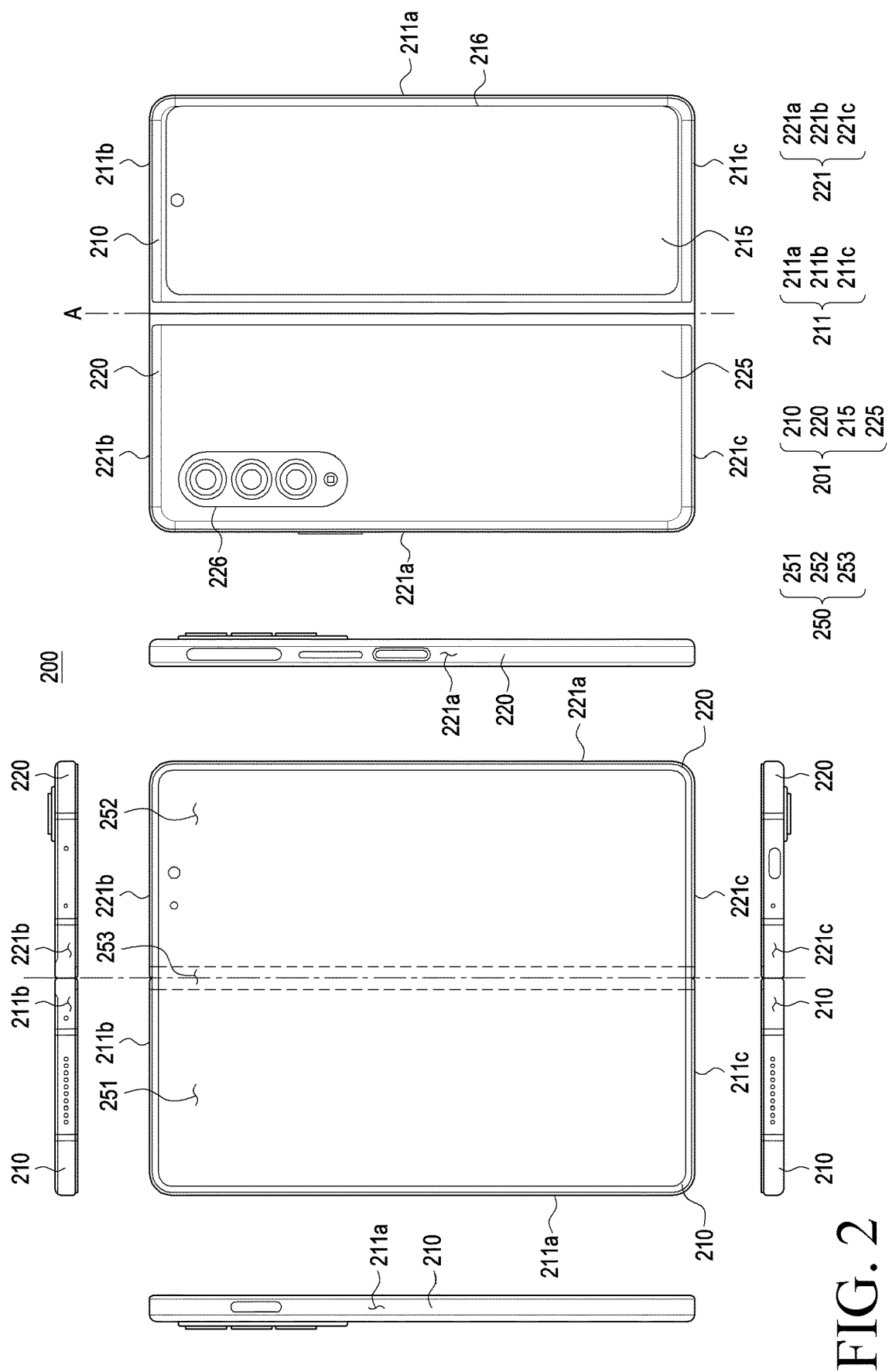
FIG. 2 is a view illustrating an unfolded status of an electronic device according to an embodiment disclosed herein.
Figure 3:
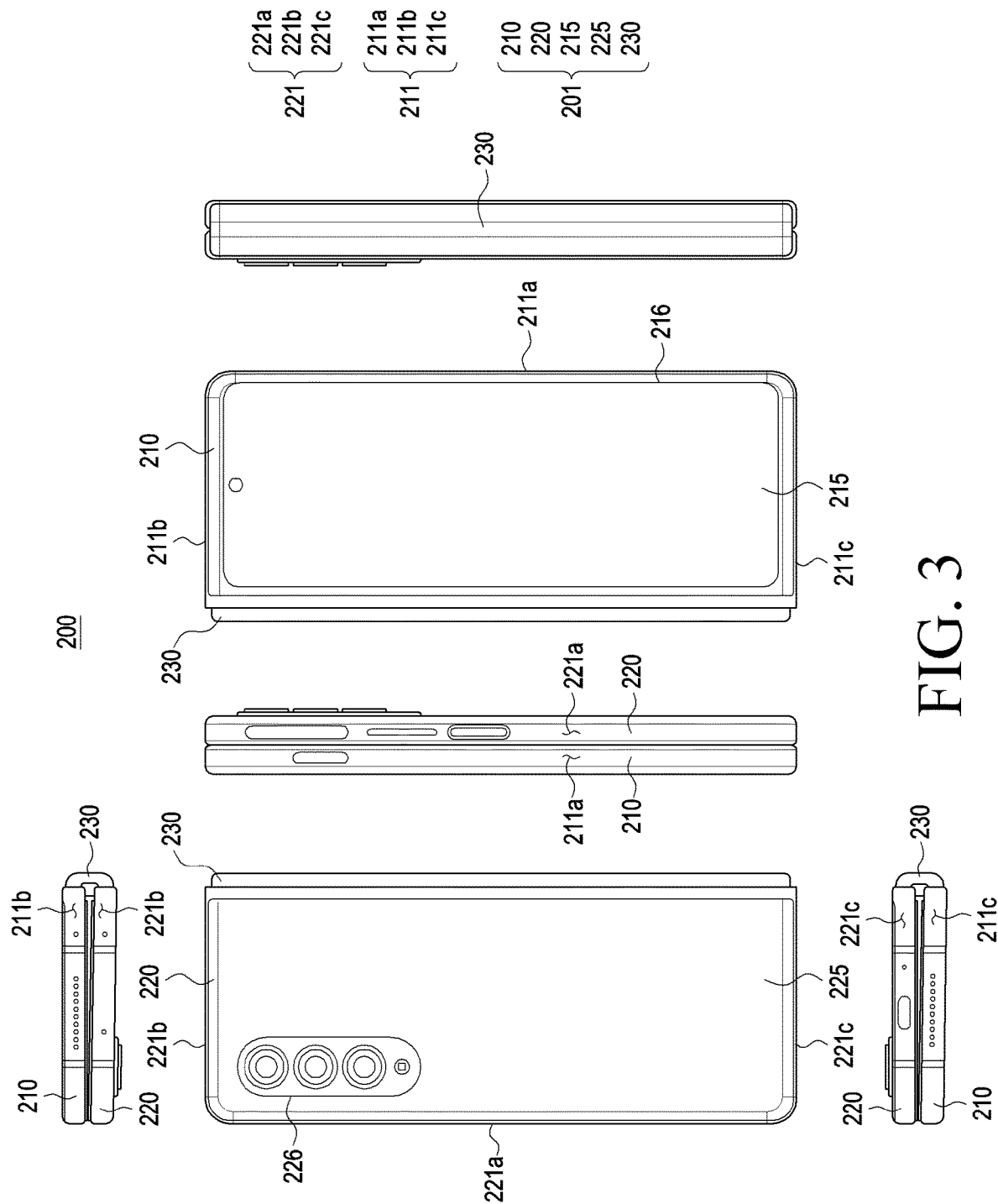
FIG. 3 is a view illustrating a folded status of an electronic device according to an embodiment disclosed herein.

FIG. 2 is a view illustrating an unfolded status of an electronic device 200 according to an embodiment disclosed herein. FIG. 3 is a view illustrating a folded status of an electronic device 200 according to an embodiment disclosed herein. The electronic device 200 may be an embodiment of the electronic device 101 shown in FIG. 1 and may be a foldable (or bendable) electronic device.

Referring to FIG. 2 and FIG. 3, in an embodiment, an electronic device 200 may include a foldable housing 201, and a flexible or foldable display 250 (hereinafter, for short, "display" 250) (for example, the display device 160 of FIG. 1) disposed in a space formed by the foldable housing 201. According to embodiment, the surface on which the display 250 is disposed (or through which the display 250 is exposed to the outside of the electronic device 200) may be referred to as the front surface of the electronic device 200. The surface opposite to the front surface may be referred to as the rear surface of the electronic device 200. The surface surrounds the space between the front surface and the rear surface may be defined as the lateral surface of the electronic device 200.

According to an embodiment, the foldable housing 201 may include a first housing 210, a second housing 220 which may include a sensor area, a first rear cover 215, a second rear cover 225, and a hinge structure 230. Here, the hinge structure 230 may include a hinge cover configured to cover a foldable area of the foldable housing 201. The foldable housing 201 of the electronic device 200 is not limited to the shape and combination shown in FIG. 2 and FIG. 3, and may be implemented by another shape or a combination and/or coupling of components. For example, in another embodiment, the first a housing structure 210 and the first rear cover 215 may be integrated together and the second housing 220 and the second rear cover 225 may be integrated together.

According to an embodiment, the first housing 210 may be connected to the hinge structure 230 and include a first front surface facing a first direction and a first rear surface facing the direction opposite to the first direction. The second housing 220 may be connected to the hinge structure 230 and include a second front surface facing a second direction and a second rear surface facing the direction opposite to the second direction. The second housing 220 may rotate about the hinge structure 230 with respect to the first housing 210. The electronic device 200 may be folded state or the unfolded state.

According to an embodiment, the first housing 210 may include a first lateral surface 211a disposed in parallel with a folding axis A of the hinge structure 230 between the first front surface and the first rear surface, and the second housing 220 may include a second lateral surface 221a disposed in parallel with the folding axis A of the hinge structure 230 between the second front surface and the second rear surface. In addition, the first housing 210 may include a third lateral surface 211b which is perpendicular to the first lateral surface 211a and has one end connected to the first lateral surface 211a and the other end connected to the hinge structure 230, and a fourth lateral surface 211c which is perpendicular to the first lateral surface 211a, has one end connected to the first lateral surface 211a and the other end connected to the hinge structure 230, and is spaced apart from the third lateral surface 211b in a parallel direction. The second housing 220 may include a fifth lateral surface 221b which is perpendicular to the second lateral surface 221a and has one end connected to the second lateral surface 221a and the other end connected to the hinge structure 230, and a sixth lateral surface 221c which is perpendicular to the second lateral surface 221a, has one end connected to the second lateral surface 221a and the other end connected to the hinge structure 230, and is spaced apart from the fifth lateral surface 221b in a parallel direction. When the second housing 220 is folded with respect to the first housing 210 around the hinge structure 230, the first lateral surface 211a may be closer to the second lateral surface 221a, and when the second housing 220 is unfolded with respect to the first housing 210 around the hinge structure 230, the first lateral surface 211a may be farther away from the second lateral surface 221a.

According to an embodiment, in the electronic device 200, the first front surface may face the second front surface in the fully folded state and the second direction may be the same as the first direction in the fully unfolded state. In the fully unfolded state, the distance between the first lateral surface 211a and the second lateral surface 221a may be the longest possible.

According to an embodiment, the first housing 210 and the second housing 220 may be arranged at opposite sides of the folding axis A and may be generally symmetrical with respect to the folding axis A. As described below, the angle and distance between the first housing 210 and the second housing 220 may vary according to whether the electronic device 200 is unfolded state, folded state, or partially unfolded (or partially folded) intermediate state.

According to an embodiment, as shown in FIG. 2, the first housing 210 and the second housing 220 may together form a recess for receiving the display 250. According to an embodiment, at least a portion of the first housing 210 and the second housing 220 may be made of metal or non-metal material having selected strength for supporting the display 250. At least one metallic portion of the housing may provide a ground plane for the electronic device 200 and may be electrically connected to a ground line formed on a printed circuit board disposed in the foldable housing 201.

According to an embodiment, the first rear cover 215 may be disposed on one side of the folding axis A on the rear surface of the electronic device 200, and have, for example, a substantially rectangular shape that is surrounded by the first housing 210. Similarly, the second rear cover 225 may be disposed on the other side of the folding axis A on the rear surface of the electronic device 200, and may have a periphery surrounded by the second housing 220.

According to an embodiment, the first rear cover 215 and the second rear cover 225 may be substantially symmetrical to each other with respect to the folding axis A. However, the first rear cover 215 and the second rear cover 225 are necessarily symmetrical and in other embodiments, the electronic device 200 may include the first rear cover 215 and the second rear cover 225 having various shapes. In another embodiment, the first rear cover 215 and the first housing 210 may be integrated and the second rear cover 225 and the second housing 220 may be integrated.

According to an embodiment, the first rear cover 215, the second rear cover 225, the first housing 210, and the second housing 220 may form a space for receiving various components (for example, printed circuit board or battery) of the electronic device 200 disposed therein. According to an embodiment, one or more components may be arranged on or visually exposed through the rear surface of the electronic device 200. By way of example, at least a portion of a sub display may be visually exposed through a first rear area 216 of the first rear cover 215. For another example, one or more components or sensors may be visually exposed through a second rear area 226 of the second rear cover 225. In an embodiment, the sensor may include a proximity sensor and/or a rear camera.

According to an embodiment, a front camera exposed to the front surface (for example, the second front surface) of the electronic device 200 and the rear camera exposed through the second rear surface area 226 of the second rear cover 225 may include one or more of lenses, image sensors, and/or image signal processors. A corresponding flash may be implemented by, for example, a light-emitting diode or a xenon lamp. In an embodiment, two or more lenses (infrared camera, wide-angle, and telephoto lenses) and image sensors may be arranged on one surface of the electronic device 200.

Referring to FIG. 3, the hinge cover 232 (see FIG. 4) may be disposed between the first housing 210 and the second housing 220 and configured to cover an internal component (for example, the hinge structure 230). According to an embodiment, the hinge structure 230 may be covered or exposed by a portion of the first housing 210 and the second housing 220 according to a state of the electronic device 200 (i.e. unfolded, intermediate state, or folded).

According to an embodiment, as shown in FIG. 2, when the electronic device 200 is unfoldedstate (for example, fully unfolded state), the hinge structure 230 may be covered by the first housing 210 and the second housing 220 so that it is not exposed. In another example, as shown in FIG. 3, when the electronic device 200 is folded state (for example, fully folded state), the hinge structure 230 may be exposed to the outside between the first housing 210 and the second housing 220. In yet another example, when in the intermediate state in which the first housing 210 and the second housing 220 are folded at a certain angle between 0 and 180 degrees, the hinge structure 230 may be partially exposed to the outside between the first housing 210 and the second housing 220. In this case, the exposed area may be smaller than that when the device is fully folded state. In an embodiment, the hinge structure 230 may include a curved surface. The hinge cover 232 may be used to cover the hinge structure 230 that would be otherwise exposed.

According to an embodiment, the display 250 may be disposed in a space formed by the foldable housing 201. For example, the display 250 may be seated in a recess formed by the foldable housing 201 and exposed to the outside through the front surface (for example, the first front surface and/or the second front surface) of the electronic device 200. For example, the display 250 may occupy substantially most of the front surface (for example, the first front surface and/or the second front surface) of the electronic device 200. Accordingly, the front surface (for example, the first front surface and/or the second front surface) of the electronic device 200 may include the display 250, and a partial area of the first housing 210 and a partial area of the second housing 220 adjacent to the display 250. In addition, the rear surface (for example, the first rear surface and/or the second rear surface) of the electronic device 200 may include the first rear cover 215, a partial area of the first housing 210 adjacent to the first rear cover 215, the second rear cover 225, and a partial area of the second housing 220 adjacent to the second rear cover 225.

According to an embodiment, the display 250 may be referred to as a flexible display having an area that is bendable from a flat surface or a curved surface. According to an embodiment, the display 250 may include a folding area 253, a first area 251 disposed at one side (for example, left side of the folding area 253 shown in FIG. 2) with reference to the folding area 253, and a second area 252 disposed at the other side (for example, right side of the folding area 253 shown in FIG. 2).

However, the division of areas in the display 250 of FIG. 2 is exemplary and the display 250 may be divided into multiple areas (for example, two or more than four) according to the structure or function thereof. For example, the area of the display 250 may be divided by the folding area 253 extending parallel with the folding axis A in the embodiment of FIG. 2, and in another embodiment, the area of the display 250 may be divided with reference to another folding axis (for example, the folding axis parallel with the width direction of the electronic device).

According to an embodiment disclosed herein, the display 250 may be combined with or disposed adjacent to a touch panel including touch sensing circuit and a pressure sensor for measuring strength (pressure) of touches. For example, the display 250, when implemented as a touch panel, may be coupled or disposed adjacent to a touch panel for detecting a stylus pen using electromagnetic resonance (EMR).

According to an embodiment, the first are 251 and the second are 252 may have overall symmetrical shapes with respect to the folding area 253.

Hereinafter, the operation of the first housing 210 and the second housing 220 and each area of the display 250 according to the state of the electronic device 200 (for example, folded state, unfolded state, or intermediate state state) will be described.

According to an embodiment, when the electronic device 200 is unfolded state (for example, FIG. 2), the first housing 210 and the second housing 220 may be arranged to form an angle of 180 degrees therebetween and face the same direction. The surface of the first area 251 and the surface of the second area 252 of the display 250 may form an angle of 180 degrees therebetween and face the same direction (for example, the front direction of electronic device). Here, the folding area 253 may be co-planar with the first area 251 and the second area 252.

According to an embodiment, when the electronic device 200 is folded (for example, FIG. 3), the first housing 210 and the second housing 220 may be arranged to face each other. The surface of the first area 251 and the surface of the second area 252 of the display 250 may form a narrow angle (for example, 0 degrees to 10 degrees) therebetween and face to each other. At least a portion of the folding area 253 may be bent to be a curved surface having a certain curvature.

According to an embodiment, when the electronic device 200 is in the intermediate state, the first housing 210 and the second housing 220 may be arranged at a certain angle. The surface of the first area 251 and the surface of the second area 252 of the display 250 may form an angle therebetween larger than that when the device is folded state and smaller than that when the device is unfolded state. At least a portion of the folding area 253 may be bent to be a curved surface having a certain curvature, and in this case, the curvature may be smaller than that when the device is folded state.

Figure 4:
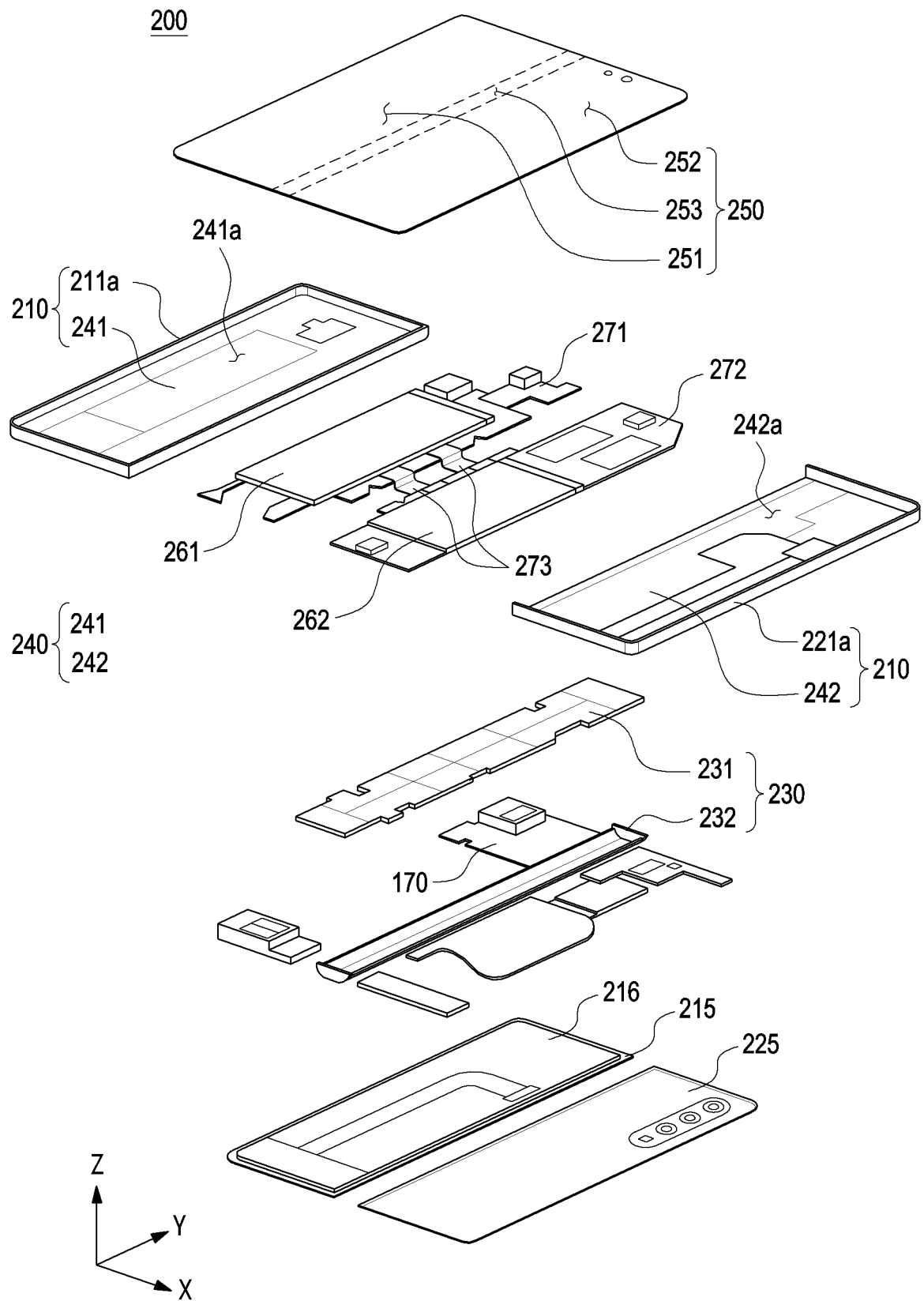
FIG. 4 is an exploded perspective view of an electronic device according to an embodiment disclosed herein.

FIG. 4 is an exploded perspective view of an electronic device 200 according to an embodiment disclosed herein.

FIG. 4 and subsequent drawings use a spatial coordinate system defined by X-axis, Y-axis, and Z-axis orthogonal to each other. The X-axis may represent the width direction of the electronic device, the Y-axis may represent the longitudinal direction of the electronic device, and the Z-axis may represent the height (or thickness) direction of the electronic device. In describing certain embodiments of the disclosure, the "first direction" and the "second direction" may refer to directions parallel with the Z-axis.

In describing components of the electronic device 200 shown in FIG. 4, the description of the components described above with reference to FIG. 2 and FIG. 3 will be omitted of duplicative.

The electronic device 200 according to an embodiment disclosed herein may include various electronic components arranged inside and outside the first housing 210 and the second housing 220. The various electronic components may include, for example, a processor (for example, the processor 120 in FIG. 1), a memory (for example, the memory 130 in FIG. 1), an input module (for example, the input module 150 in FIG. 1), a sound output module (for example, the sound output module 155 in FIG. 1), a display 250 (for example, the display module 160 in FIG. 1), an audio module (for example, the audio module 170 in FIG. 1), a sensor (for example, the sensor module 176 in FIG. 1), an interface (for example, the interface 177 in FIG. 1), a connection terminal (for example, the connection terminal 178 in FIG. 1), a haptic module (for example, the haptic module 179 in FIG. 1), a camera module (for example, the camera module 180 in FIG. 1), a power management module 188, a battery 261 and 262 (for example, the battery 189 in FIG. 1), a communication module (for example, the communication module 190 in FIG. 1), a subscriber identification module (for example, the subscriber identification module 196 in FIG. 1), or an antenna module (for example, the antenna module 197 in FIG. 1). These electronic components may be arranged inside or outside the first housing 210 and the second housing 220. At least one (for example, the connection terminal 178) of the components may be omitted from the electronic device 200, or one or more components may be added to the electronic device. Alternatively, portions of the components or multiple components may be integrated into a single component.

According to an embodiment, the foldable electronic device 200 may include multiple batteries in order to feed power required for driving to electronic components or store power. For example, the first housing 210 and the second housing 220 may include a first battery 261 and a second battery 262 disposed therein, respectively.

According to an embodiment, the foldable electronic device 200 may include a plate 240 used to seat components in the first housing 210 and the second housing 220. Various electronic components and/or the printed circuit board 271 and 272 may be disposed on the plate 240. According to an embodiment, the plate 240 may include multiple plates 241 and 242. For example, the first plate 241 and the first printed circuit board 271 may be disposed in the first housing 210, and the second plate 242 and the second circuit board 272 may be disposed in the second housing 220. The first plate 241 may include a first surface 241a facing the first direction, and the second plate 242 may include a second surface 242a facing the second direction. The first plate 241 and the second plate 242 may be folded or unfolded with respect to each other by the hinge structure 230 disposed to correspond to the folding area 253 of the display 250. The first plate 241 and the second plate 242 may face each other when the device is folded state, and the first surface 241a and the second surface 242a may face the same direction when the device is unfolded state. The hinge structure 230 may include a hinge plate 231 and/or a hinge cover 232 and the first plate 241 and the second plate 242 may be disposed on the two sides around the hinge plate 231 of the hinge structure 230, respectively.

In order to implement various functions and operations of the electronic device 200, signals of the processor may be transferred to electronic components through various conductive lines and/or connectors 273 arranged on the printed circuit board 271 and 272.

Figure 5:
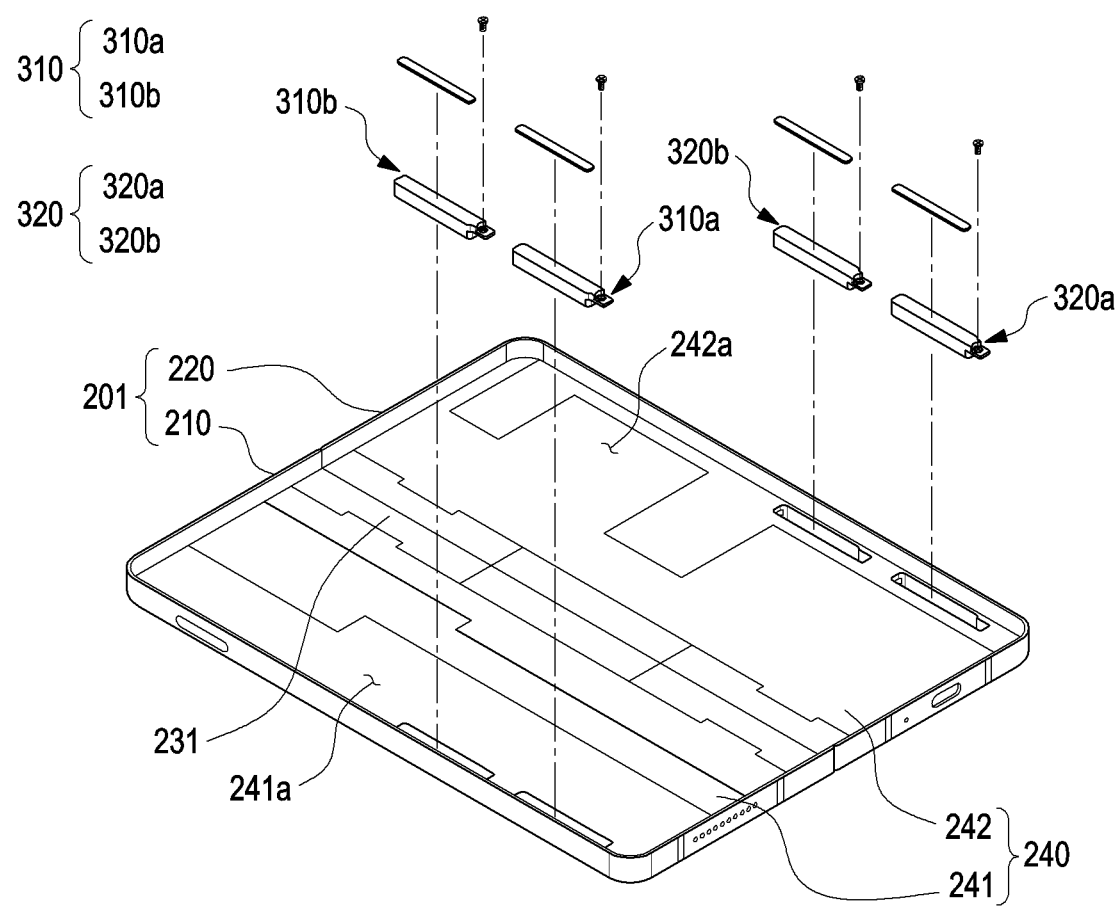
FIG. 5 is an exploded perspective view of an electronic device including a first magnet and a second magnet according to an embodiment disclosed herein.
Figure 6:
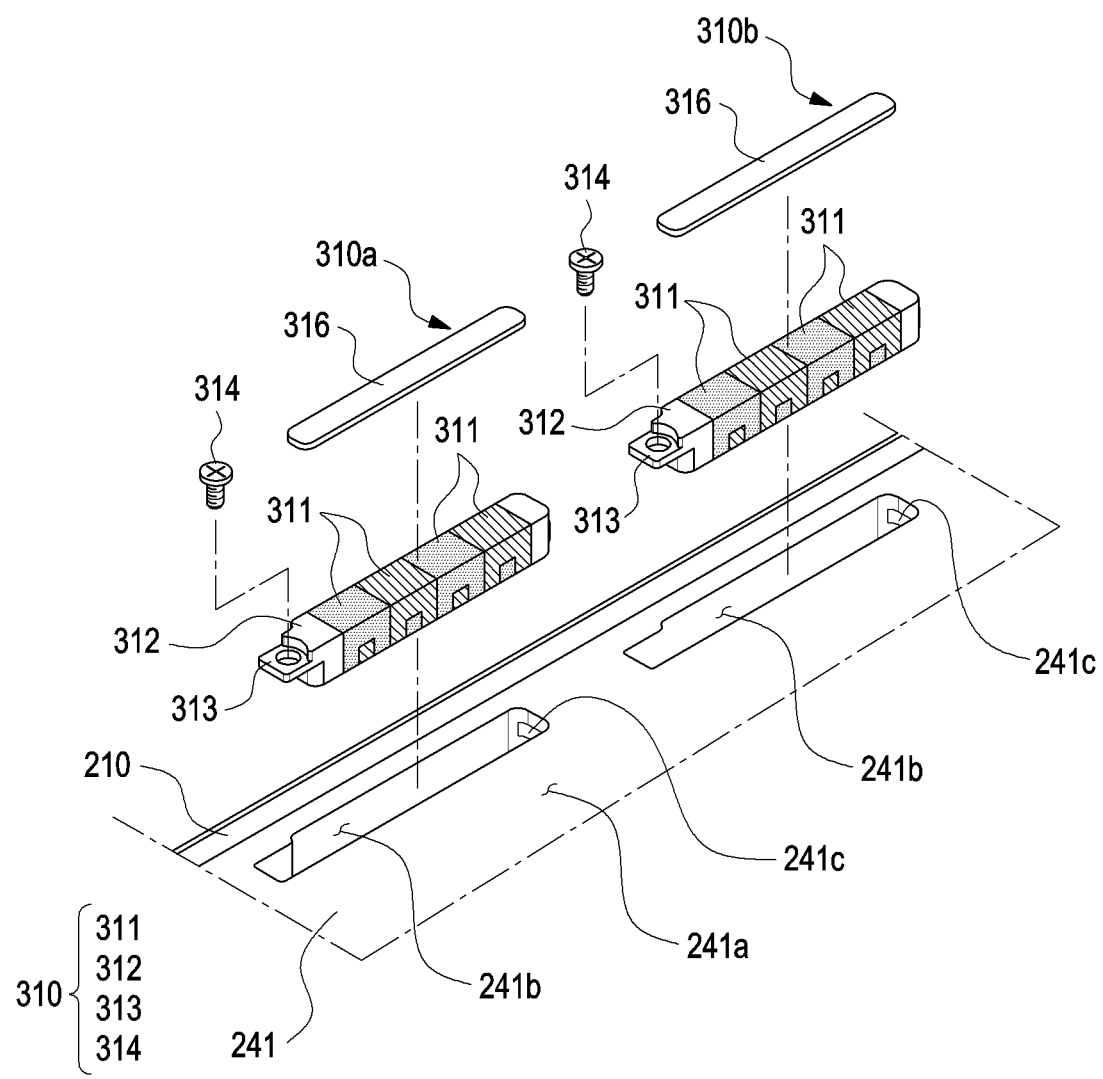
FIG. 6 is a view illustrating a first magnet according to an embodiment disclosed herein.
Figure 7:
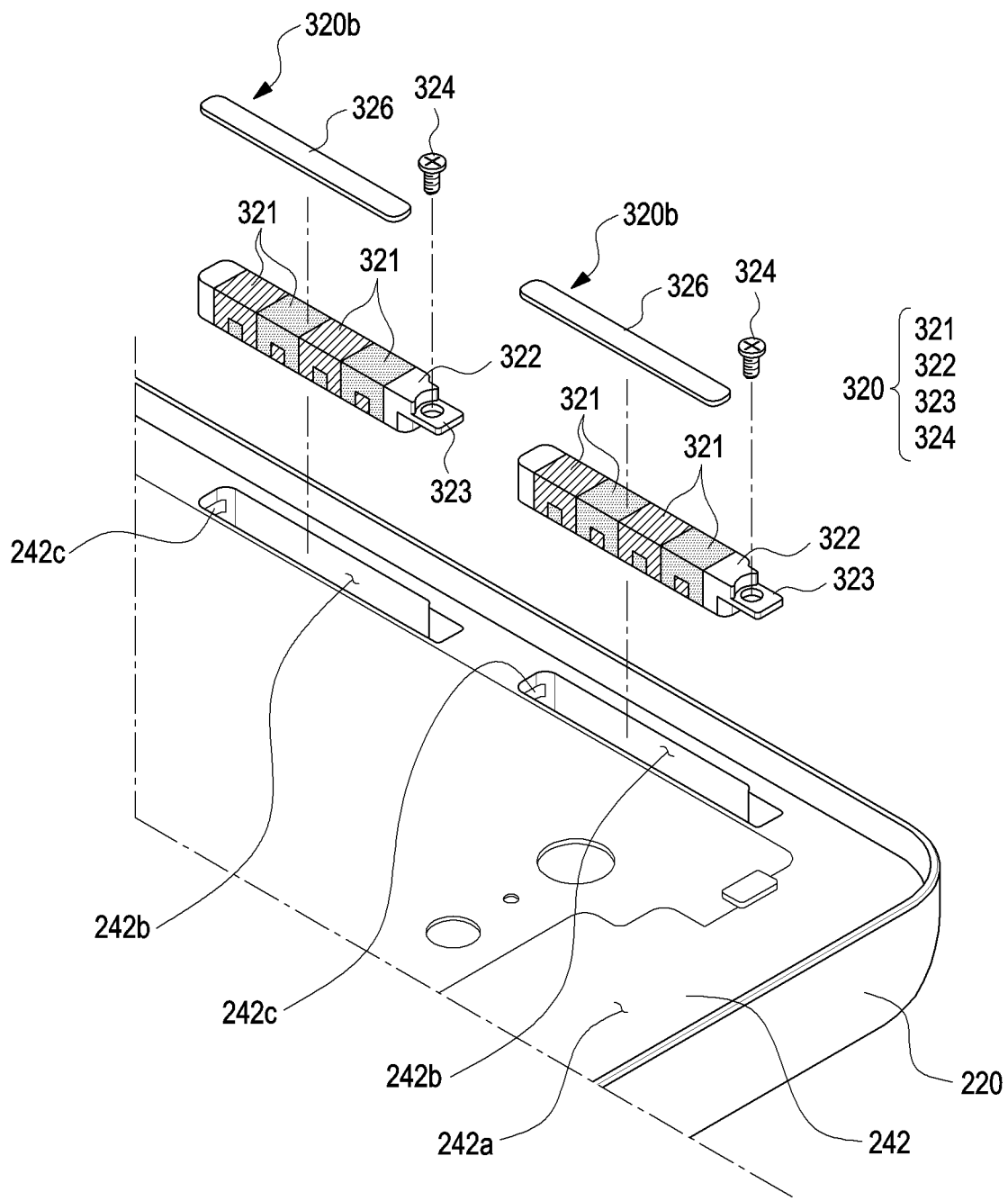
FIG. 7 is a view illustrating a second magnet according to an embodiment disclosed herein.

FIG. 5 is an exploded perspective view of an electronic device including a first magnet and a second magnet according to an embodiment disclosed herein. FIG. 6 is a view illustrating a first magnet according to an embodiment disclosed herein. FIG. 7 is a view illustrating a second magnet according to an embodiment disclosed herein.

Referring to FIG. 5, the foldable electronic device 200 may be provided with a fixation structure using a magnetic substance to stably maintain the folded status.

The foldable electronic device 200 including the fixation structure using the magnetic substance according to an embodiment disclosed herein may include a first magnet 310 which is disposed in a position adjacent to an edge of the first housing 210 and includes a magnetic substance arranged in the longitudinal direction (for example, the Y-axis direction in FIG. 4) of the first housing 210, and a second magnet 320 which is disposed in a position adjacent to an edge of the second housing 220 and corresponding to the first magnet 310, and is arranged in the longitudinal direction (for example, the Y-axis direction in FIG. 4) of the second housing 220.

According to an embodiment disclosed herein, the first magnet 310 and the second magnet 320 may be disposed on the front surface of the plate 240. For example, the first magnet 310 may be disposed on the first surface 241a of the first plate 241, and the second magnet 320 may be disposed on the second surface 242a of the second plate 242. In addition, according to an embodiment, in the first housing 210, the first magnet 310 may be disposed in a position adjacent to a first lateral surface (for example, the first lateral surface 211a in FIG. 2) spaced apart from the hinge structure (for example, the hinge structure 230 in FIG. 3) and may be parallel to the hinge structure. For example, the first magnet 310 may be disposed in a position between the first battery (for example, the first battery 261 in FIG. 4) the first lateral surface (for example, the first lateral surface 211a in FIG. 2). In addition, in the second housing 220, the second magnet 320 may be disposed in a position adjacent to a second lateral surface (for example, the second lateral surface 221a in FIG. 2) spaced apart from the hinge structure (for example, the hinge structure 230 in FIG. 3) and the hinge structure. For example, the second magnet 320 may be disposed in a position between the second battery (for example, the second battery 262 in FIG. 4) and the hinge structure.

The first magnet 310 and the second magnet 320 may be disposed in parallel with the longitudinal direction of the first housing 210 and the second housing 220. According to an embodiment, multiple first magnets 310 and second magnets 320 may be provided. For example, the first magnet 310 may include a (1-1)th magnet 310a and a (1-2)th magnet 310b, and the second magnet 320 may include a (2-1)th magnet 320a and a (2-2)th magnet 320b. The (1-1)th magnet 310a and the (1-2)th magnet 310b, and the (2-1)th magnet 320a and the (2-2)th magnet 320b may have substantially the same shape, and each may be arranged in parallel along the longitudinal direction (for example, the Y-axis direction in FIG. 4) of the electronic device 200. According to another embodiment, the first magnet 310 and the second magnet 320 may be implemented by, for example, three or more magnets, contrary to what is shown in FIG. 5. When each of the first magnet 310 and the second magnet 320 includes multiple magnets, the multiple magnets may be arranged along a virtual straight line parallel with the longitudinal direction (for example, the Y-axis direction in FIG. 4) of the electronic device 200.

Referring to FIG. 6, the first magnet 310 may be received in a recess 241b formed on the first plate 241. Accordingly, the first recess 241b may be formed on the first plate 241 to have size and shape corresponding to the first magnet 310 to receive the first magnet 310 therein. According to an embodiment, a groove 241c for assembling the first magnet 310 may be additionally formed inside the first recess 241b.

The first magnet 310 may include a magnetic substance array 311, a magnetic substance housing 312 configured to surround at least one surface of the magnetic substance array 311, and a first protrusion 313 protruding from one side of the magnetic substance housing 312 and having a fastening hole formed therethrough.

The magnetic substance array 311 may be made of multiple permanent magnetic bodies attached to each other in one direction (for example, the longitudinal direction or the Y-axis direction in FIG. 4 of the electronic device 200), and the multiple permanent magnet bodies may be arranged to form a magnetic field in a direction different from that of the adjacent magnetic bodies. Here, the number of arranged magnetic bodies may be not limited.

The magnetic substance housing 312 may be integrally molded with the magnetic substance array 311. In addition, according to an embodiment, the magnetic substance housing 312 may be non-metallic, such as a synthetic resin having high strength. For example, the magnetic substance housing 312 may be made of fiber reinforced plastics (FRP). Furthermore, for example, the magnetic substance housing 312 may be made by the method of curing a resin extruded around the magnetic substance array 311 when the magnetic substance array 311 is seated in a mold.

By way of example, at least a portion of the housing (the first housing 210 and/or the second housing 220) of the electronic device may be made of metal and the metallic portion may be used as a radiator of an antenna. In this embodiment, when the first magnet 310 is disposed adjacent to the lateral side of the electronic device housing, the magnetic force of the first magnet 310 may affect the housing of the electronic device serving as the antenna radiator so as to degrade performance of the antenna. To prevent the degradation of the antenna performance as described above, the magnetic substance housing 312 may be made with a synthetic resin rather than a metal.

The first protrusion 313 may be configured to protrude in one direction from the magnetic substance housing 312 and include a hole to which the fastening member 314 (for example, a screw) may be fastened. As the fastening member 314 is fastened to the hole included in the first protrusion 313, the first magnet 310 may be fixed to the first plate 241, and therefore, the first magnet 310 may be prevented from being lifted out of the first recess 241b by the attraction applied when the first magnet 310 is disposed adjacent to the second magnet 320.

Referring to FIG. 7, the second magnet 320 may be received in a recess 242b formed on the second plate 242. Accordingly, the first recess 242b may be formed on the second plate 242 to have size and shape corresponding to the second magnet 320 to receive the second magnet 320 therein. According to an embodiment, a groove 242c for assembling the second magnet 320 may be additionally formed inside the second recess 242b.

The second magnet 320 may include a magnetic substance array 321, a magnetic substance housing 322 configured to surround at least one surface of the magnetic substance array 321, and a first protrusion 323 protruding from one side of the magnetic substance housing 322 and having a fastening hole formed therethrough.

The magnetic substance array 321, the magnetic substance housing 322, and the first protrusion 323 included in the second magnet 320 are the same as or similar to the magnetic substance array 311, the magnetic substance housing 312, and the first protrusion 313 included in the first magnet, and thus the description thereof will be omitted.

The magnetic substance array 321 included in the second magnet 320 may correspond to the magnetic substance array 311 included in the first magnet 310. Here, when it is stated that the magnetic substance array 321 corresponds to another magnetic substance array 311, it may mean that the number of magnetic substances attached to each other is the same and the overall length of the magnetic substance array is the same.

Figure 8:
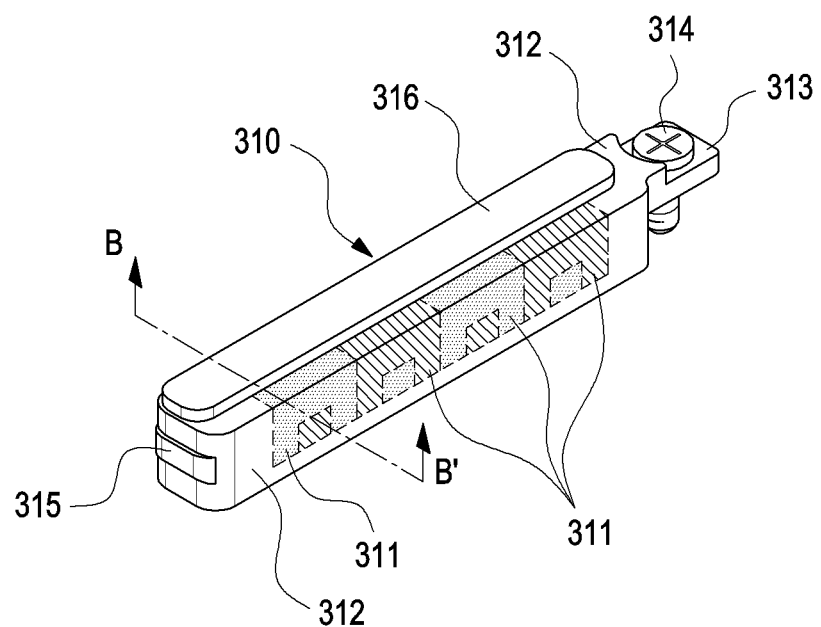
FIG. 8 is a perspective view illustrating a magnet according to an embodiment disclosed herein.
Figure 9:
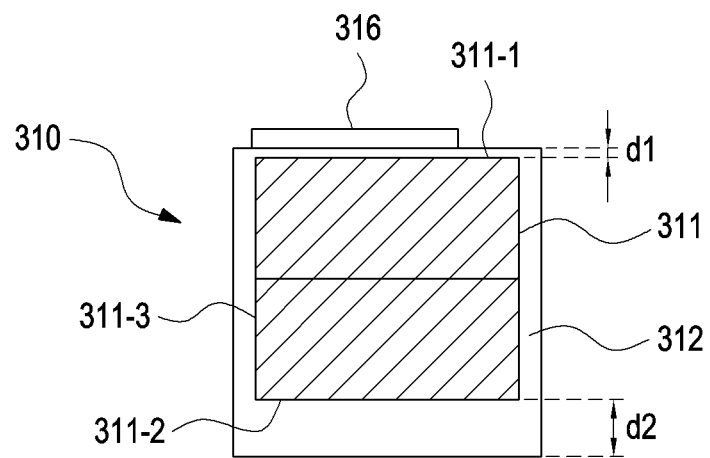
FIG. 9 is a cross-sectional view of the magnet shown in FIG. 8.
Figure 10:
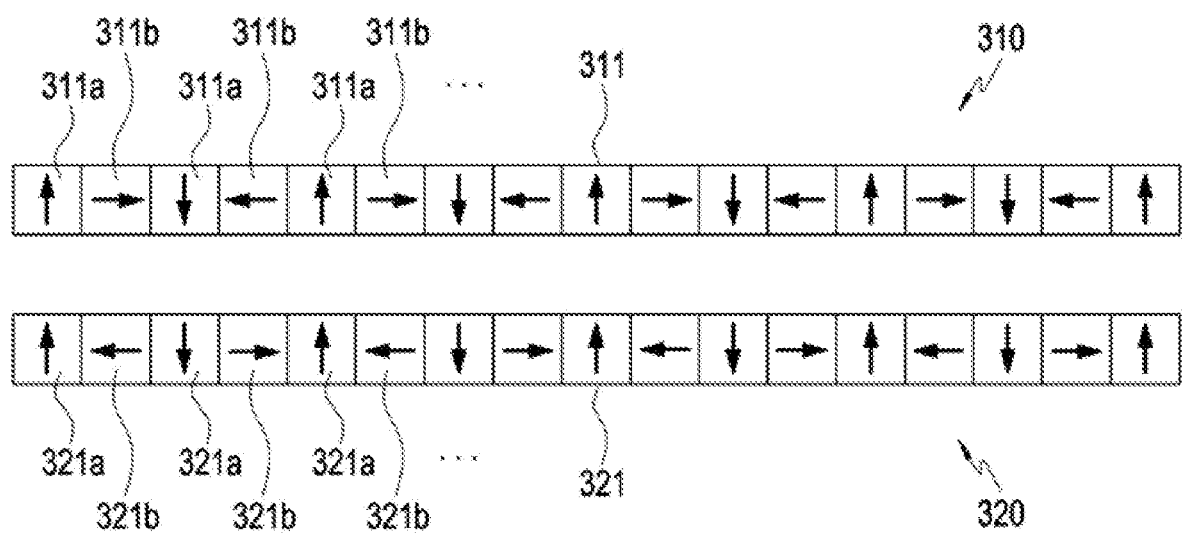
FIG. 10 is a view illustrating a magnetic substance array having a Halbach array according to an embodiment disclosed herein.

FIG. 8 is a perspective view illustrating a magnet according to an embodiment disclosed herein. FIG. 9 is a cross-sectional view (a cross-sectional view taken along B-B') of the magnet shown in FIG. 8. FIG. 10 is a view illustrating a magnetic substance array having a Halbach array according to an embodiment disclosed herein.

The fixation structure including magnetic substance that is included in the electronic device according to an embodiment will be described in detail with reference to FIG. 8 to FIG. 10 together with the drawings described above. The first magnet 310 will be described as an example of magnetic bodies shown in FIG. 8 to FIG. 10. The description thereof may be applied to that of the second magnet 320. FIG. 8 is a view of the first magnet 310 of FIG. 6 from the opposite side.

Referring to FIG. 8 and FIG. 9, the first magnet 310 may include a magnetic substance array 311, a magnetic substance housing 312 configured to surround at least one surface of the magnetic substance array 311, and a first protrusion 313 protruding from the magnetic substance housing 312 in a direction (for example, the longitudinal direction or the Y-axis direction in FIG. 4 of the electronic device).

The magnetic substance array 311 may include an upper surface 311-1 facing a first direction, a lower surface 311-2 facing a direction opposite to the first direction, and a lateral surface 311-3 between the upper surface 311-1 and the lower surface 311-2. In addition, the magnetic substance housing 312 may be formed to surround the entirety of at least one surface of the magnetic substance array 311, for example, the upper surface 311-1, the lower surface 311-2, and the lateral surface 311-3. According to an embodiment, here, as the thickness d1 of the portion of the magnetic substance housing 312 covering the upper surface 311-1 of the magnetic substance array 311 is thinner than the thickness d2 of the portion of the magnetic substance housing 312 covering the lower surface 311-2 of the magnetic substance array 311. Thus, the magnetic substance housing 312 may surround at least one surface of the magnetic substance array 311 to provide a stable fixation structure while reducing the effect of the magnetic force generated by the magnetic substance array 311 on other components of the electronic device.

According to an embodiment, the first magnet 310 may further include, in addition to the first protrusion 313, a second protrusion 315 protruding from the magnetic substance housing 312 in the direction opposite to the direction in which the first protrusion 313 protrudes. The second protrusion 315 may have a shape corresponding to a groove 241c formed in the first recess (for example, the first recess 241b in FIG. 6) of the first plate (for example, the first plate 241 in FIG. 6). According to an embodiment, the first magnet 310 may be fastened to the first plate 241 at one side thereof in a tightening manner using the first protrusion 313 and the fastening member 314 and fastened to the first plate 241 at the other side thereof in a hook (and/or fitting) manner using the second protrusion 315, so as to implement a stable fixation structure. As a result, even when the first magnet 310 is disposed on the first surface (for example, the first surface 214a in FIG. 6) of the first plate 241, the attraction between the first magnet 310 and the second magnet 320 may prevent the first magnet 310 from being lifted.

Referring to FIG. 10, the magnetic substance array 311 may configure a Halbach array in which a series of permanent magnets produce a weak magnetic field in one direction but a strong magnetic field in another direction. According to an embodiment, when the magnetic substance array 311 (hereinafter, it may be referred to as a "first magnetic substance array 311") of the first magnet 310 forms the Halbach array, the magnetic substance array 321 (hereinafter, it may be referred to as a "second magnetic substance array 321") of the second magnet 320 may form the Halbach array, as well. For example, referring to FIG. 10, the first magnetic substance array 311 may include multiple first magnetic poles 311a configured to produce magnetic field in the direction perpendicular to the longitudinal direction of the first magnetic substance array 311 and multiple second magnetic poles 311b configured to produce magnetic field in the direction parallel with the longitudinal direction, where the multiple first magnetic poles 311a and the multiple second magnetic poles 311b may be alternatingly arranged to produce a strong magnetic field toward the upper surface (for example, 311-1 in FIG. 9) of the first magnetic substance array 311. The second magnetic substance array 321 may include multiple third magnetic poles 321a configured to produce magnetic field in the direction perpendicular to the longitudinal direction of the second magnetic substance array 321 and multiple fourth magnetic poles 321b configured to produce magnetic field in the direction parallel with the longitudinal direction, where the multiple third magnetic poles 321a and the multiple fourth magnetic poles 321b may be alternatingly arranged to produce a strong magnetic field toward the upper surface of the second magnetic substance array 321. As shown in FIG. 10, in when the first magnetic substance array 311 and the second magnetic substance array 321 are aligned to face each other, when the first magnetic pole 311a of the first magnetic substance array 311 and the third magnetic pole 321a of the second magnetic substance array 321 face the same direction, and the second magnetic pole 311b of the first magnetic substance array 311 and the fourth magnetic pole 321b of the second magnetic substance array 321 face directions different from each other, the attraction force may be produced between the magnetic substance arrays 311 and 321. As such, as the magnetic substance arrays 311 and 321 are formed to be the Halbach array, the maximum magnetic force may be realized while minimizing the space (or area) occupied by the magnetic substance arrays 311 and 321 inside the electronic device 200.

According to certain embodiments disclosed herein, as the magnetic substance arrays 311 and 321 included in the first magnet 310 and the second magnet 320 are configured to be the Halbach array, compared to ordinary magnet arrays, the strength of magnetic force may increase in one direction (the first direction and the second direction) while the strength of magnetic force may decrease in other directions. The effect of the magnetic force on various electronic components disposed on a rear surface of the first magnet 310 and the second magnet 320, in other words, the rear surface of the plate (for example, the plate 240 in FIG. 5) may be remarkably reduced. Accordingly, the advantage of not attaching a separate shielding sheet to the first magnet 310 and the second magnet 320 to protect electronic components disposed on the rear surface of the first magnet 310 and the second magnet 320 may be achieved. For example, when a separate shielding sheet is attached to the first magnet 310 and the second magnet 320 to protect other electronic components, the magnetic force of the first magnet 310 and the second magnet 320 may be reduced. However, a separate shielding sheet does not need to be attached to the first magnet 310 and the second magnet 320 according to embodiments of the disclosure, and thus the magnetic force reduction due to the separate shielding sheet may be prevented.

Referring to FIG. 8 again, the first magnet 310 is formed in a shape extending in one direction (for example, the Y-axis direction in FIG. 4), and an impact absorption member 316 having the shape extending similar to the first magnet 310 may be provided on the first magnet 310.

Hereinafter, referring to FIG. 11 to FIG. 13, the impact absorption member 316 will be described in detail.

Figure 11:
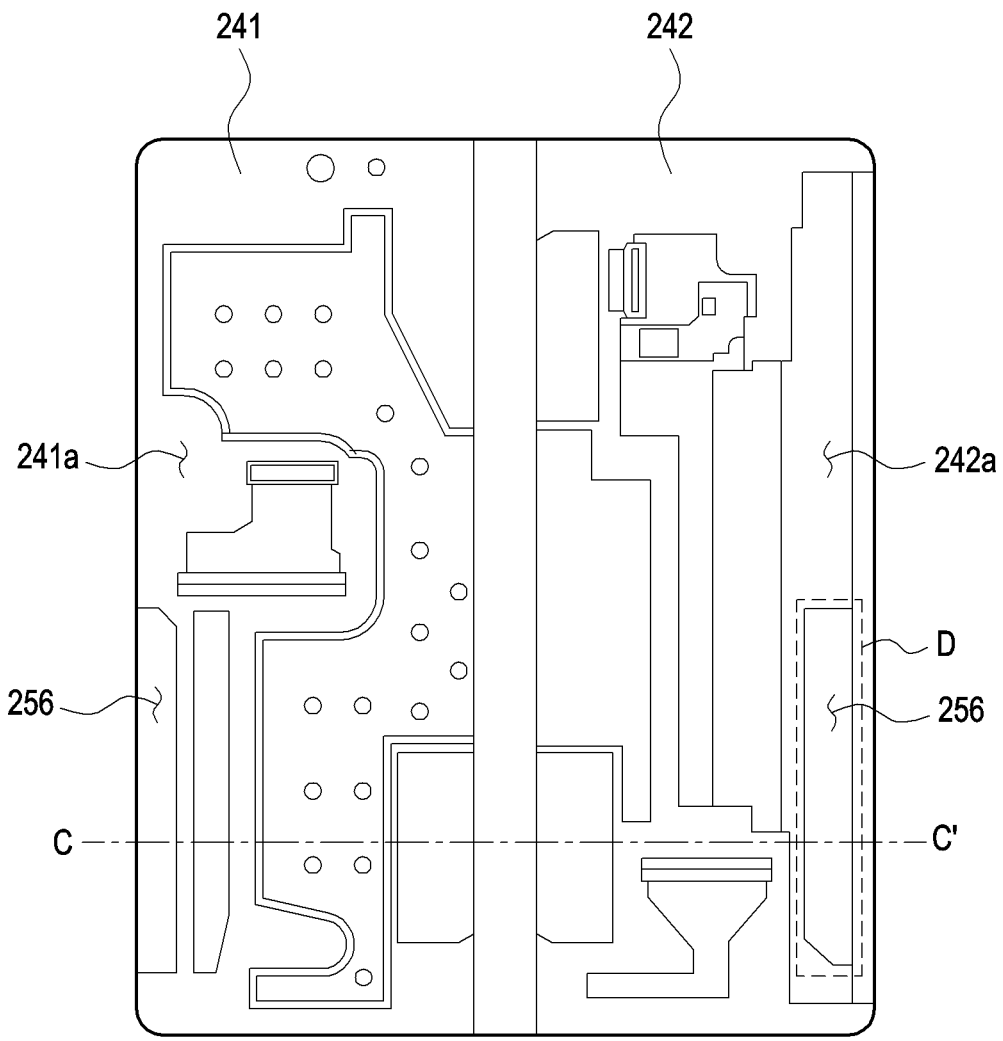
FIG. 11 is a view illustrating plates according to an embodiment disclosed herein.

FIG. 11 is a view illustrating plates according to an embodiment disclosed herein. FIG. 12 is a cross-sectional view of an electronic device according to an embodiment disclosed herein. FIG. 13 is a cross-sectional view of a folded electronic device according to an embodiment disclosed herein.

FIG. 11 shows a first plate 241 and a second plate 242 to which a block sheet 256 is disposed. The embodiment in FIG. 12 may show a cross-sectional view of the electronic device in the unfolded state taken along C-C' direction in FIG. 11, and show the arrangement relationship between the display 250 and a housing (for example, the second housing 220) including the second magnet 320 received in the second recess 242b.

Figure 12:
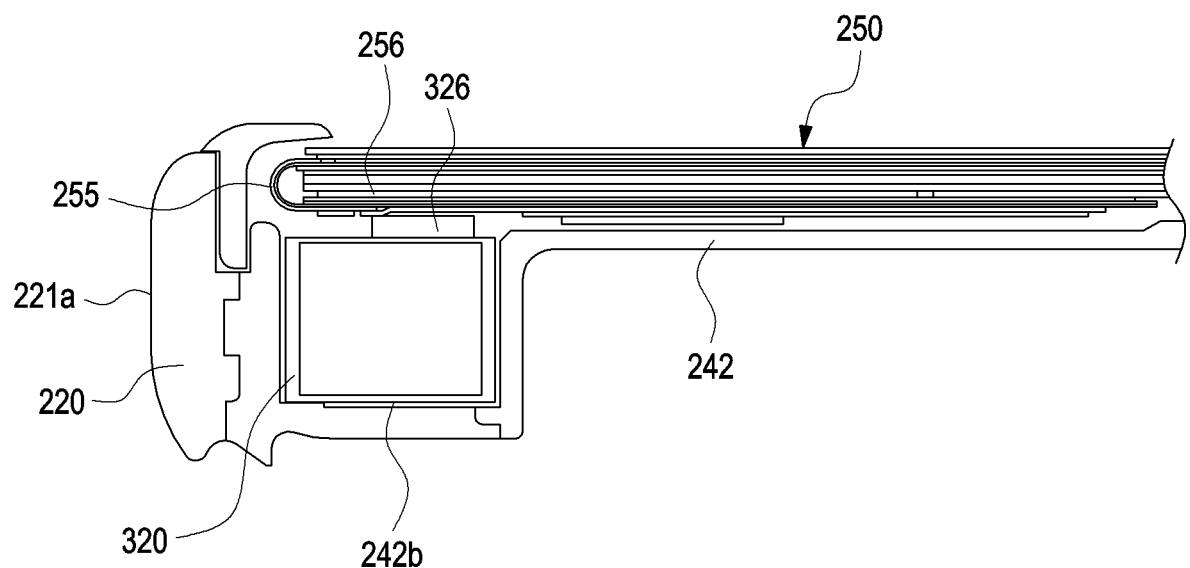
FIG. 12 is a cross-sectional view of an electronic device according to an embodiment disclosed herein.

Referring to FIG. 12, the second magnet 320 may be received in the second recess 242b formed at the second surface (for example, the second surface 242a in FIG. 7) of the second plate 242 and the rear side of the display 250. As shown in the drawing, the second magnet 320 may be disposed to be adjacent to a lateral surface of the electronic device housing (for example, the second housing 220). As described above, as the magnetic substance housing (for example, the magnetic substance housing 322 in FIG. 7) of the second magnet 320 is made of a synthetic resin material rather than metal, the electronic device 200 according to certain embodiments of the disclosure may prevent performance of an antenna from being degraded even when, for example, at least a portion of the second housing 220 includes a metal material to serve as an antenna radiator. According to an embodiment, when at least a portion of the second housing 220 is used as an antenna radiator, the second magnet 320 and the second housing 220 may be spaced apart from each other to secure performance of an antenna. For example, the second magnet 320 and the second housing 220 used as an antenna radiator may be spaced 1.5 mm or more apart from each other.

According to an embodiment, multiple layers of multiple panels including a digitizer panel may be stacked on the display 250, and some of the panels may be implemented as chip on glass (COG), chip on panel (COP), and/or chip on film (COF) depending on the arrangement of the display drive IC.

For example, FIG. 12 shows the display 250 including a COP digitizer panel. In addition, FIG. 12 shows a COP bending part 255 and a shielding sheet 256 disposed on the COP bending part 255 and multiple layers, and the shielding sheet 256 may serve to protect the digitizer panel from noise that may be caused by an external magnetic force.

According to an embodiment, a predetermined gap may be formed between the second magnet 320 and the display 250. When the second magnet 320 is disposed at the rear surface of the display 250, attraction force may be applied on the shielding sheet 256 by the second magnet 320 and thus the COP bending part 255 may be pulled toward the gap. When COP bending part 255 is pulled toward the gap, the COP bending part 255 and/or a bending protect layer (BPL) of the COP bending part 255 may be damaged. In order to prevent such damage, the electronic device may further include an impact absorption member 326.

According to an embodiment, the impact absorption member 326 (for example, sponge, Poron, and/or other elastic members) may be attached on the second magnet 320 and fill the gap between the second magnet 320 and the display 250. According to an embodiment, the impact absorption member 326 may have a thickness equal to the distance of the gap. For example, when the predetermined gap between the second magnet 320 and the display 250 is 0.35 mm, the thickness of the impact absorption member 326 may be formed to have a thickness of 0.35 mm as well. Therefore, even when attraction force occurs between the second magnet 320 and the shielding sheet 256, the COP bending part 255 is not pulled toward the gap and thus the COP bending part 255 and/or the BPL of the COP bending part 255 may be prevented from being damaged.

Although the embodiment in FIG. 12 has been described only for the second magnet 320, the description thereof may be identically applied to the first magnet 310.

Figure 13:
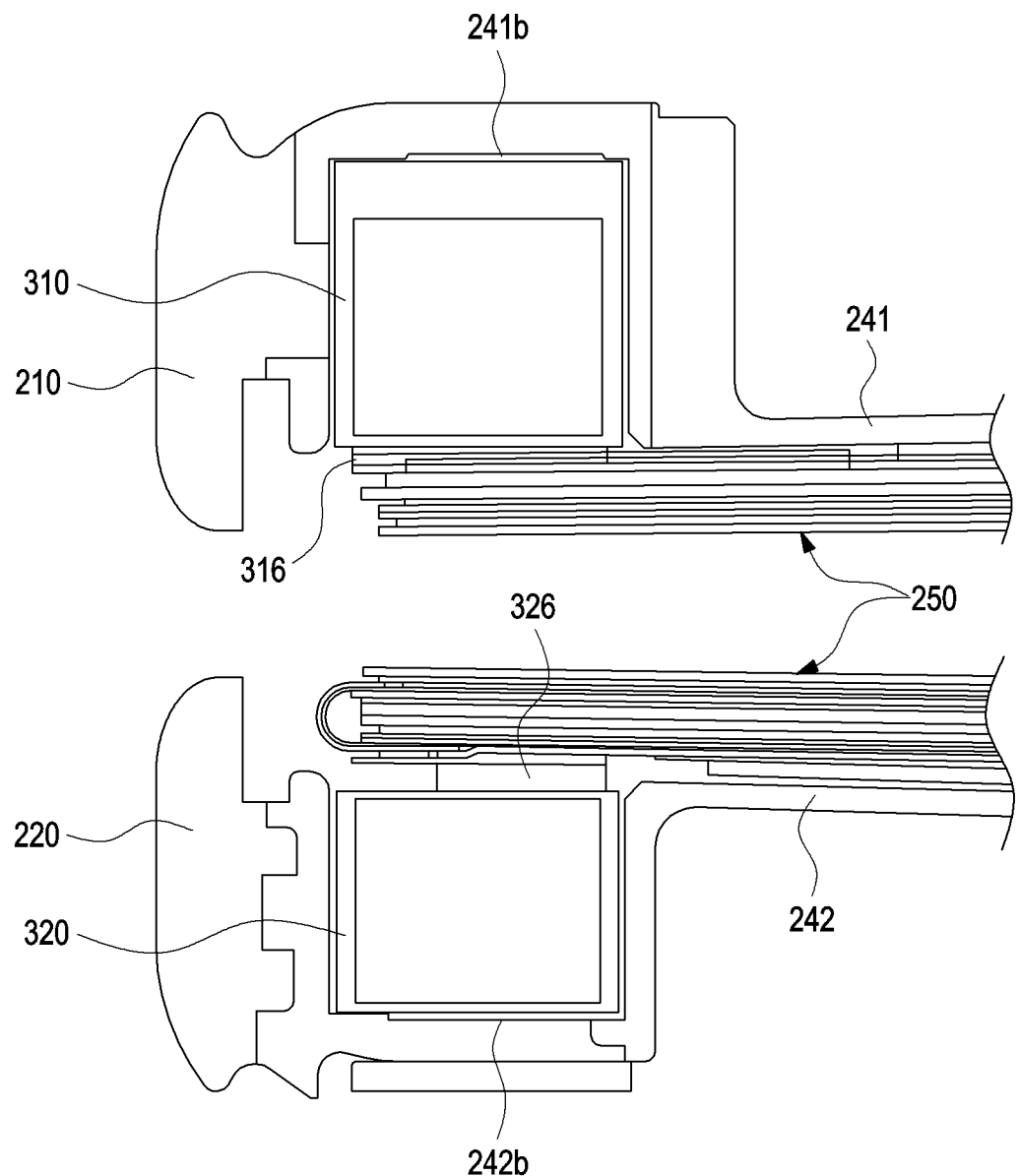
FIG. 13 is a cross-sectional view of an electronic device in a folded state according to an embodiment disclosed herein.

Referring to FIG. 13, the electronic device 200 may further include an impact absorption member 316 configured to fill a gap between the first magnet 310 and the display 250 in addition to the impact absorption member 326 configured to fill the gap between the second magnet 320 and the display 250.

The electronic device 200 according to certain embodiments disclosed herein may allow to secure more magnetic force by respectively disposing the first magnet 310 and the second magnet 320 on the front surfaces (for example, the first surface 241a and the second surface 242a in FIG. 4) of the first plate 241 and the second plate 242 compared to when the first magnet and the second magnet are disposed on the rear surfaces of the first plate 241 and the second plate 242. Embodiments disclosed herein may also prevent damage due to closer distances between the magnetic bodies by including impact absorption members 316 and 326 between the first magnet 310 and the display 250 and between the second magnet 320 and the display 250. The impact absorption members 316 and 326 and the arrangement thereof may be operated more efficiently, particularly in the electronic device including the Halbach array according to an embodiment disclosed herein.

In addition, the electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third elementAs used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An embodiment disclosed herein may provide a foldable electronic device (for example, the foldable electronic device in FIG. 2) including: a hinge structure (for example, the hinge structure 230 in FIG. 3); a first housing (for example, the first housing 210 in FIG. 2) connected to the hinge structure; a second housing (for example, the second housing 220 in FIG. 2) connected to the hinge structure and configured to be foldable with respect to the first housing with reference to the hinge structure; a flexible display (for example, the flexible display 250 in FIG. 2) disposed on one surface of the first housing and one surface of the second housing; a first plate (for example, the first plate 241 in FIG. 4) disposed inside the first housing and including a first surface (for example, the first surface 241a in FIG. 4) facing a first direction; a second plate (for example, the second plate 242 in FIG. 4) disposed inside the second housing and including a second surface (for example, the second surface 242a in FIG. 4) facing a second direction parallel with the first direction in a unfolded state of the foldable electronic device; a first magnet (for example, the first magnet 310 in FIG. 5) disposed in a position adjacent to an edge of the first housing on the first surface of the first plate and including a magnetic substance arranged along the longitudinal direction of the first housing; and a second magnet (for example, the second magnet 320 in FIG. 5) disposed in a position adjacent to an edge of the second housing and corresponding to the first magnet on the second surface of the second plate, and including a magnetic substance arranged along the longitudinal direction of the second housing.

According to an embodiment, the first magnet may be received in a first recess (for example, the first recess 241b in FIG. 6) formed on the first surface and the second magnet may be received in a second recess (for example, the second recess 242b in FIG. 6) formed on the second surface.

According to an embodiment, the first magnet and the second magnet each may include: a magnetic substance array (for example, the magnetic substance array 311 and 321 in FIG. 6 and FIG. 7); a magnetic substance housing (for example, the magnetic substance housing 312 and 322 in FIG. 6 and FIG. 7) configured to surround at least one surface of the magnetic substance array; and a first protrusion (for example, the first protrusion 313 and 323 in FIG. 6 and FIG. 7) protruding from one side of the magnetic substance housing and including a fastening hole formed therethrough.

According to an embodiment, the first magnet and the second magnet may further include a second protrusion (for example, the second protrusion 315 in FIG. 8) protruding from another side of the magnetic substance housing.

According to an embodiment, the first magnet and the second magnet may be disposed in a direction parallel with the longitudinal direction of the first housing and the second housing.

According to an embodiment, each of the magnetic substance array included in the first magnet and the second magnet may be configured to produce magnetic force toward the first direction and the second direction.

According to an embodiment, the magnetic substance array of the first magnet and the magnetic substance array of the second magnet each may form a Halbach array.

According to an embodiment, the magnetic substance housing may be integrated with the magnetic substance array.

According to an embodiment, the magnetic substance housing may be made of fiber reinforced plastics (FRP).

According to an embodiment, a first battery may be included in an internal space of the first housing, the first magnet may be disposed in a space between the first battery and the first housing, a second battery may be included in an internal space of the second housing, and the second magnet may be disposed in a space between the second battery and the second housing.

According to an embodiment, impact absorption members may be further included between the flexible display and the first magnet and between the flexible display and the second magnet.

An embodiment disclosed herein may provide a foldable electronic device including: a hinge structure having a folding axis; a first housing connected to the hinge structure to be rotatable around the folding axis and including a first front surface facing a first direction, a first rear surface facing a direction opposite to the first direction, and a first lateral surface disposed in parallel with and spaced apart from the folding axis of the hinge structure between the first front surface and the first rear surface; a second housing including a second front surface connected to the hinge structure to be rotatable around the folding axis and facing a second direction, a second rear surface facing a direction opposite to the second direction, and a second lateral surface disposed in parallel with and spaced apart from the folding axis of the hinge structure between the second front surface and the second rear surface; a flexible display disposed on the first front surface of the first housing and the second front surface of the second housing; a first plate disposed inside the first housing and including a first surface facing the first direction; a second plate disposed inside the second housing and including a second surface facing the second direction parallel with the first direction in an unfolded state of the foldable electronic device; a first magnet disposed in a position adjacent to the first lateral surface of the first housing on the first surface of the first plate and including a magnetic substance arranged along the longitudinal direction of the first housing; and a second magnet disposed in a position adjacent to the second lateral surface of the second housing and a position corresponding to the first magnet on the second surface of the second plate and including a magnetic substance arranged along the longitudinal direction of the second housing.

According to an embodiment, the first magnet and the second magnet may include: a magnetic array; a magnetic housing configured to surround at least one surface of the magnetic substance array, and a first protrusion protruding from one side of the magnetic substance housing and including a fastening hole formed therethrough and a second protrusion protruding from another side of the magnetic substance housing.

According to an embodiment, the magnetic substance array of the first magnet and the magnetic substance array of the second magnet each may form a Halbach array.

According to an embodiment, gaps may be formed between the flexible display and the first magnet and between the flexible display and the second magnet.

According to an embodiment, impact absorption members may be further included in the gaps between the flexible display and the first magnet and between the flexible display and the second magnet.

As mentioned above, in the detailed description of the disclosure, specific embodiments have been described, but it will be apparent to those of ordinary skill in the art that various modifications are possible without departing from the scope of the disclosure.

What is claimed is:

1. A foldable electronic device comprising:
    a hinge structure;
    a first housing connected to the hinge structure;
    a second housing connected to the hinge structure and configured to be foldable with respect to the first housing around an axis of the hinge structure;
    a flexible display;
    a first plate disposed inside the first housing and including a first surface facing a first direction;
    a second plate disposed inside the second housing and including a second surface facing a second direction parallel with the first direction in an unfolded state of the foldable electronic device;
    a first magnet disposed in a position adjacent to an edge of the first housing on the first surface of the first plate and including a magnetic substance arranged along a longitudinal direction of the first housing;
    a second magnet disposed in a position adjacent to an edge of the second housing and corresponding to the first magnet on the second surface of the second plate, and including a magnetic substance arranged along a longitudinal direction of the second housing,
    wherein the first magnet is received in a first recess formed on the first surface,
    wherein the second magnet is received in a second recess formed on the second surface; and
    wherein the first magnet and the second magnet each comprises:
        a magnetic substance array;
        a magnetic substance housing configured to surround at least one surface of the magnetic substance array; and
        a first protrusion protruding from one side of the magnetic substance housing and including a fastening hole formed therethrough.

2. The foldable electronic device of claim 1, wherein the first magnet and the second magnet each further comprises a second protrusion protruding from another side of the magnetic substance housing.

3. The foldable electronic device of claim 2, wherein a groove is formed in each of the first recess and the second recess to receive the second protrusion.

4. The foldable electronic device of claim 1, wherein magnetic substance arrays included in the first magnet and the second magnet are configured to provide magnetic force toward the first direction and the second direction, respectively.

5. The foldable electronic device of claim 1, wherein the magnetic substance array of the first magnet and the magnetic substance array of the second magnet each forms a Halbach array.

6. The foldable electronic device of claim 1, wherein the magnetic substance housing is integrated with the magnetic substance array.

7. The foldable electronic device of claim 1, wherein the magnetic substance housing is made of fiber reinforced plastics (FRP).

8. The foldable electronic device of claim 1, wherein the first magnet and the second magnet are disposed in parallel with the longitudinal direction of the first housing and the second housing.

9. The foldable electronic device of claim 1, wherein each of the first magnet and the second magnet comprises multiple magnets.

10. The foldable electronic device of claim 1, wherein a first battery is included in an internal space of the first housing,
    wherein the first magnet is disposed in a space between the first battery and the first housing,
    wherein a second battery is included in an internal space the second housing, and
    wherein the second magnet is disposed in a space between the second battery and the second housing.

11. The foldable electronic device of claim 1, wherein gaps are formed between the flexible display and the first magnet and between the flexible display and the second magnet.

12. The foldable electronic device of claim 11, further comprising:
    impact absorption members disposed in the gaps between the flexible display and the first magnet and between the flexible display and the second magnet.

13. The foldable electronic device of claim 1, wherein the flexible display further comprises a digitizer panel and a shielding sheet configured to protect the digitizer panel.

* * * * *